United States Patent [19]
Sheppard

[11] 3,796,408
[45] Mar. 12, 1974

[54] EXHAUST CONTROL VALVE

[75] Inventor: William L. Sheppard, Romulus, Mich.

[73] Assignee: AVM Corporation, Jamestown, N.Y.

[22] Filed: Jan. 15, 1973

[21] Appl. No.: 323,947

[52] U.S. Cl.............. 251/58, 92/98 D, 165/35, 165/52, 251/61
[51] Int. Cl............................. F16k 13/165
[58] Field of Search............ 251/58, 61; 165/35, 52; 92/98

[56] References Cited
UNITED STATES PATENTS

| | | |
|---|---|---|
| 2,914,917 | 12/1959 | VanNest........................ 165/35 X |
| 3,125,001 | 3/1964 | Cripe........................... 92/98 D UX |
| 3,131,757 | 5/1964 | Bergstrom et al.................. 165/35 |
| 3,221,719 | 12/1965 | Ulrich............................ 165/52 X |

*Primary Examiner*—Henry T. Klinksiek
*Attorney, Agent, or Firm*—Harness, Dickey & Pierce

[57] ABSTRACT

An exhaust control valve system for controlling the flow of engine exhaust gases and arranged to inhibit heat transfer from the exhaust to linkage portions of the system to permit lower cost and more effective friction reducing features, and in which a mechanism is provided to prevent rattling at either limit position of the valve and to insure accurate operation.

11 Claims, 4 Drawing Figures

PATENTED MAR 12 1974 3,796,408
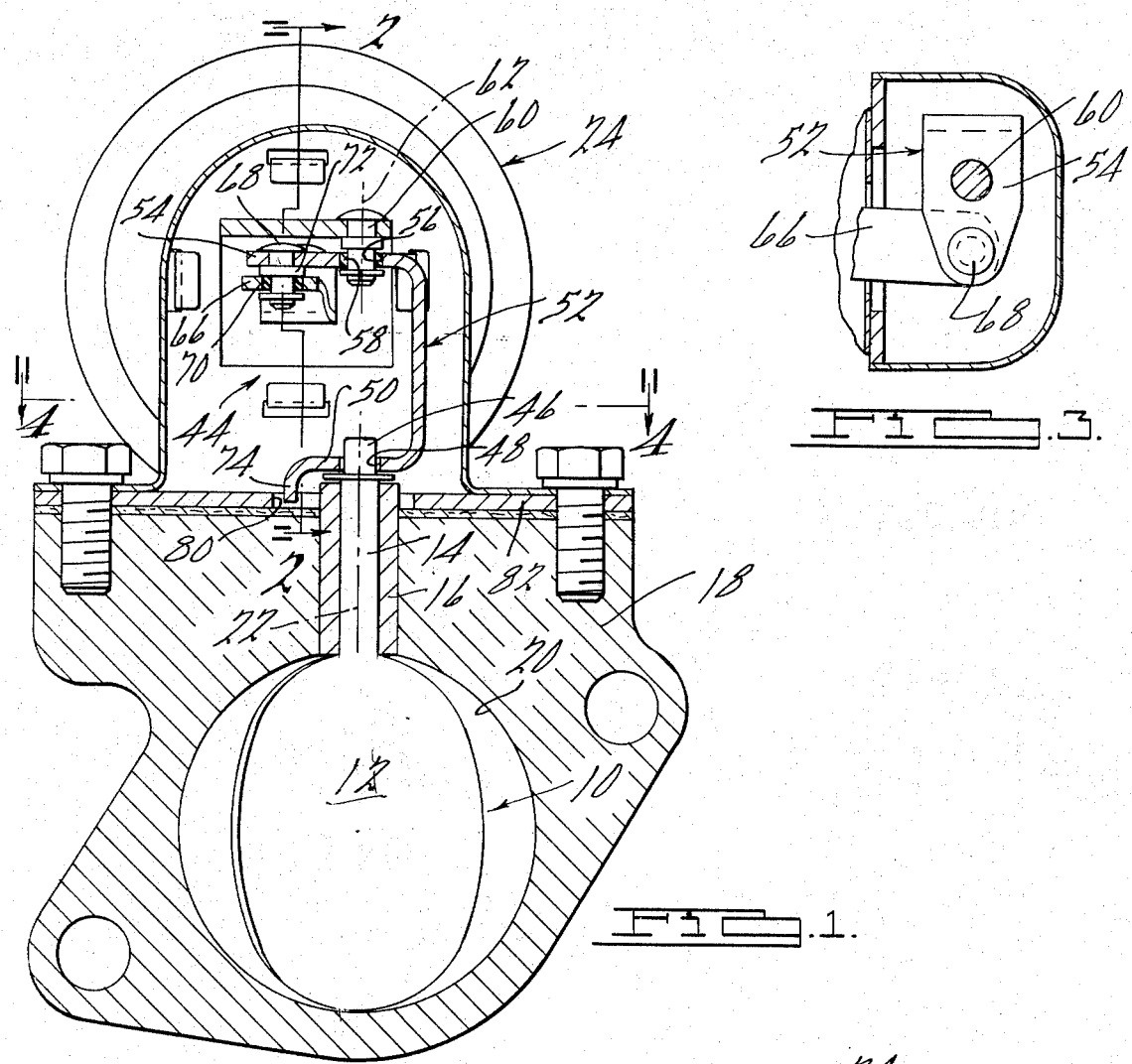

EXHAUST CONTROL VALVE

BACKGROUND AND SUMMARY OF THE INVENTION

In certain automotive applications, exhaust gases, normally directly discharged from the exhaust manifold to the atmosphere via an exhause pipe, muffler, and tailpipe system (with or without pollution-reducing devices) are temporarily diverted under cold-engine conditions, such as being diverted through a heat exchanger to pre-warm the intake manifold. In a representative utilization, the diversion occurs until the temperature of a portion of the engine rises to a preselected value, unless, during that period, a condition arises which dictates that diversion should be temporarily terminated, such as a transient full opening of the throttle. In such systems, there has been difficulty in achieving a satisfactory driving connection between feasible actuating devices (the power output of which is limited) and the exhaust control valve. The valve itself is subjected to the temperature of exhaust gases which often rise well in excess of 1,000° F. The transfer of that heat to the linkage between the valve and the actuator as well as to the bearings and pivots in the system is highly condusive to bearing and pivot failure, leading to malfunctioning of the control valve with consequences which can be seriously detrimental to the engine. In addition, such control valves are subject to force variations which, coupled with the valve construction, tend to lead to quite audible rattling at either of the limit positions of the valve (open or closed), or at both of those positions.

The present invention is directed to a control valve suitable for the above described and other uses, with an improved bearing and linkage system imposing reduced system losses, reducing malfunctioning due to overheating, and preventing rattling at either of the limit positions of the control valve.

BRIEF DESCRIPTION OF THE DRAWINGS

The accompanying drawings illustrate a preferred embodiment of the invention in accordance with the best mode presently contemplated for carrying out the invention.

FIG. 1 is an elevational view, in partial section, of an exhaust control valve embodying the present invention;

FIG. 2 is a vertical sectional view taken substantially along the line 2—2 of FIG. 1;

FIG. 3 is a fragmentary horizontal sectional view taken substantially along the line 3—3 of FIG. 2; and FIG. 4 is a fragmentary horizontal sectional view taken substantially along the line 4—4 of FIG. 1.

DESCRIPTION OF THE PREFERRED EMBODIMENT

The assembly of the present invention comprises an exhaust valve 10 including a valve plate 12 connected to a shaft 14 rotatably supported in a bearing insert 16 which is press fitted in a body casting 18 having a port 20 therein. Valve plate 12 is rotatable about an axis 22 between one position in which port 20 is effectively blocked or closed and a second position (after a rotation of approximately 90°) in which port 20 is essentially open. Port 20 is or may be in an exhaust discharge path of the engine. For example, it may be located between the exhaust manifold and the exhaust pipe (or a pipe constituting an element of the exhaust system) of the automobile. As in certain current practices, when the flow of exhaust gases through port 20 is blocked or majorly impeded by the closure of valve plate 20, those gases travel via an auxiliary path to the remainder of the exhaust system, that path normally including a heat exchanger so as to utilize, as during engine warm-up, the excess heat in the exhaust gas to perform a pre-warming function.

Valve plate 12 is rotated under the control of an actuator 24 which in the illustrated arrangement is a pneumatic servo. Actuator 24 includes a servo piston 26 secured by means of rivet 28 to a flexible diaphragm 30, the outer peripheral bead of which is secured to the housing 32 of the actuator 24, diaphragm 30 dividing the cavity within housing 32 into isolated cavity portions 34 and 36. A spring 38 biases piston 26 in a direction to reduce the size of the cavity portion 34 (i.e. to the right in the view of FIG. 2). Cavity portion 34 is connected to atmosphere. Cavity portion 36 may be selectively connected to the intake manifold of the internal combustion engine via a nipple 40 and a valve 42. Valve 42 may be of any suitable conventional form and, in the preferred environment, is a device capable of sensing the temperature of a portion of the engine, of establishing an air-flow connection between nipple 40 and the intake manifold of the engine at sensed engine temperatures below a preselected value and of blocking that connection at sensed engine temperatures above a preselected value.

Details of the construction of portions of a suitable actuator are set forth in my U.S. Pat. application No. 263,863 filed June 19, 1972 although any other suitable construction may be employed.

Servo piston 26 constitutes a movable portion of the actuator capable of exerting limited and resilient forces in each of two directions. With valve 42 closed, cavity portion 36 reaches atmosphere pressure either due to leakage or to connection to atmosphere by valve 42. Accordingly, there is no effective pressure differential between cavity portions 34 and 36, and piston 26 is resiliently forced to the right (in the view of FIG. 2) by spring 38. The limit position of that movement may be established either by physical engagement with the housing or by design of spring 38, or otherwise, but in an operation of the disclosed system, that limit position is preferably not reached. When valve 42 is open, the pressure in cavity portion 36 is reduced, creating a pressure differential across diaphragm 30 in a sense to tend to overcome the resilient force of spring 38 and to move piston 26 to the left, (in the view of FIG. 2), the magnitude of the latter force being limited by the magnitude of the pressure differential. The limit position of that movement may be established either by physical engagement with the housing or by full bottoming of spring 38, but in the operation of the disclosed system, that limit position is preferably not reached. As will be seen, if the magnitude of the pressure differential reduces below a value related to the force of spring 38, spring 38 can move piston 26 to the right even though valve 42 is open.

Movement of the piston 26 of actuator 24 is converted to controlled rotational motion of shaft 14 and hence of valve plate 12 through a linkage system 44. The end portion 46 of circular cylindrical shaft 14 is shaped into non-circular cylindrical form. In the illustrated arrangement, it is squared. The squared end 46 of shaft 14 engages a correspondingly shaped aperture 48 in arm portion 50 of a generally U-shaped bracket 52. In the preferred arrangement, this is a relatively loose connection, rather than a secure connection or press fit. For example, the aperture 48 may be from 0.0005 to 0.005 inches or more larger, on each side, than the squared end 46 of shaft 14, so that even at the limit positions of rotational movement of valve plate 12 there is but limited-area engagement between shaft 14 and crank 52, for the purpose of establishing an inferior heat-transfer engagement between those two parts, so as to minimize the transfer of the exhaust gas heat via the plate 12 and shaft 14 to the linkage system. In addition, crank 52 is preferably made as thin as feasible in the light of its mechanical-strength requirements (such as, for example, 0.078 inches thick) to again minimize heat transfer along the length thereof.

The upper arm 54 of the generally U-shaped crank 52 extends generally in parallelism with arm 50 and is provided with an aperture 56 which accepts a bearing sleeve 58 surrounding a portion of a rivet 60 constituting a pivotal bearing for arm 54 of crank 52 for rotation thereof about the longitudinal axis 62 of the rivet 60. In the preferred arrangement, axis 62 is co-axial with axis 22 to obviate or minimize overturning loads except as hereinafter discussed. It will be observed that shaft 14, which tends to become heated as a result of heating of plate 12 by the exhaust gases, terminates in the region of arm 50 and is well spaced and remote from arm 54 and from the bearing material 58. By virtue of that fact, coupled with the relatively high thermal impedance of the path between the shaft 14 and the bearing 58, as above described, bearing material 58 need not have special high temperature capabilities but may be made, for example, of teflon so as to perform its friction reducing function effectively and well at moderate cost.

Actuator piston 26 is drivingly coupled to crank 52 by means of a link 66, with one end of that link being mechanically connected to piston 26 by rivet 28, and with the other end of link 66 being pivotally connected to arm 54 at a point thereon spaced from axis 62. Pivot rivet 68 has a first shank portion engaging an aperture in arm 54 and a second shank portion rotatably disposed within a bearing sleeve 70 which is seated in an aperture in link 66. The above described characteristics of bearing 58 also apply to bearing 70. A spacing shoulder 72 on rivet 68 is disposed between arm 54 and link 66. Thus, the pivotal connection between link 66 and arm 54 provides for rotation of arm 54 about an axis which is essentially parallel with but spaced from axis 62.

Means are provided to establish limit stop positions, in each sense, to the rotational movement of shaft 14 and of valve plate 12. In the illustrated embodiment, that stop means takes the form of a depending arm 74, integral with arm 50 of crank 52, cooperating with the end walls 76 and 78 of a slot 80 formed in a plate 82 which is fixed with respect to the body 18. Rotation of the crank 52 to the point at which arm 74 engages surface 76 defines the open position of valve 12 in relation to port 20, and rotation of the linkage to a position in which arm 74 engages surface 78 defines the closed position of valve 12 in relation to the port 20. It will be appreciated that the movable stop element 74 could, if desired, take the form of a separate element tightly secured on a portion of shaft 14, although the illustrated arrangement is presently preferred.

With the sensed temperature below the preselected value, so that valve 42 is open, vacuum is communicated to chamber 36 of actuator 24 to move actuator piston 26 to the left (FIG. 2) to draw link 66 therewith. That force is applied through rivet 68 to rotate crank 52 about axis 62-22 to a position in which stop 74 is in engagement with surface 76 and in which valve plate 12 is in fully closed relationship to port 20. In the preferred arrangement, that motion is terminated by the abutment of the stop portions 74, 76, as distinguished from the stopping occurring as the result of bottoming of piston 26 or the bottoming of spring 38. Desirably, the servo actuator 24 has additional movement capabilities following the engagement of element 74 and 76, so as to continuously exert, under that condition, a further force through link 66 in a direction tending to move the throttle plate 12 in an open sense and in a direction to establish forceable engagement between elements 74 and 76. The force is, of course, resilient and limited in the sense that it is established by the pressure differential between atmosphere and the existing intake manifold pressure acting on the effective area of the diaphragm 30 and in opposition to the force of spring 38. That continuing load on the system aids to inhibit rattling. In the preferred arrangement, link 66 is spaced from arm 54 by shoulder 72. As a result, the force exerted by link 66, under the noted conditions, is directed along the transverse centerline of bearing 70, that is, in the view of FIG. 2, substantially in the plane 84. The resultant force on rivet 68 is exerted on arm 54 essentially along the longitudinal ceterline of that portion of the rivet 68 which is surrounded by arm 54, that is, essentially in the plane 86. Accordingly, there is an overturning moment, the lever arm of which is essentially the distance between planes 84 and 86, tending to cock rivet 68 and hence tending to cock crank 52 against the resistive force established by the engagement between the stop 74 and the end wall of the slot 80 with which it is cooperating. This cocking effect, resulting from the continuing application of forces by the servo during the period in which the stop 74 blocks further rotational movement of the valve plate 12, serves, in effect, to bind up the linkage system to preclude rattling under the noted conditions. The same thing occurs at the other extreme of movement of the actuator 24, engagement of stop 74 with surface 78 at the fully open position of valve plate 22 preventing further movement of the associated portions of the linkage system 44, even though the piston member 26 of the actuator 24 is capable of further movement to the right (in the view of FIG. 2) under the impetus of spring 38, so that the continuing resilient limited-magnitude force exerted by spring 38, under that condition, again creates the above noted overturning moment tending to bind up the linkage system and prevent rattling.

Since the force exerted by actuator 24 during the time that valve 42 is open varies as a function of the pressure differential between cavity portions 34 and 36, the system has the capability of responding, under cold-engine conditions, to a major opening of the throttle (and a resultant significant reduction in intake manifold vacuum) to permit spring 38 to drive actuator piston 26 in a sense to open valve 12. While in the environment with which the system is representatively associated, the changes in pressure differential are relatively limited, and while economics and other factors dictate a limited servo diaphragm effective area, the low friction characteristics of the system, as above described, permit the just-described operation to properly occur.

It will be observed that in the illustrated and presently preferred embodiment, throttle plate 12 is essentially cantilevered from the single shaft 14, supported in bearing 16. It will be appreciated that an outboard shaft and bearing (at the lower end of plate 12 in the view of FIG. 1) could be provided, if desired, for supporting, at that end, plate 12 for rotation about axis 22.

It will be appreciated that in commercial manufacture axis 22 should be essentially co-axial with axis 62 although practicable tolerances may require or accommodate some disparity between the two, such as 0.030 inches, more or less. It will further be observed that one feature of the invention resides in the establishment of a spacing between planes 84 and 86 which is small relative to the distance between the transverse center of bearing 58 (plane 54) and both bearing 16 and arm 50. It will be appreciated that the distance between planes 54 and 84 may be increased, within the principles of the present invention, to increase the binding effect of the provided overturning moment, at the penalty of creating the effect of an overturning moment on bearing 16, and conversely, that the distance between those two planes may be reduced, if desired, down to zero.

It is to be understood that the foregoing description is that of a preferred embodiment of the invention. Various changes and modifications may be made without departing from the spirit and scope of the invention as defined by the appended claims.

What is claimed is:

1. In an exhaust control valve for association with the exhaust system of an internal combustion engine for selectively controlling the exhaust flow, the combination of a body portion having a port in an exhaust discharge path of the engine, a valve plate movable between a first position in which said port is essentially open and a second position in which said port is essentially closed and exposed to the temperature of the exhaust gases in the discharge path, shaft means secured to said plate, means for supporting said shaft means for rotation about a first axis, an actuator having a selectively movable portion, crank means having one portion connected in rotational driving relation with said shaft means, bearing means spaced from said shaft means and engaging said crank means at a portion thereof spaced from said one portion and pivotally supporting said crank for rotation about an axis essentially co-axial with said first axis, and link means connected to said crank means at a portion thereof spaced from said first axis and drivingly connecting said actuator portion to said crank means for selectively rotating said crank means.

2. The combination of claim 1 in which said actuator portion moves essentially in translation, in which said link means is connected to said crank means with a pivot connection, and in which the plane in which forces are applied by said link means to said pivot connection is spaced from the plane of said bearing means.

3. The combination of claim 1 in which said portion of said actuator means is capable of moving with limited force between a first limit position and a second limit position, and further including stop means for stopping rotational motion of said shaft means at one position in which said valve plate is essentially at said first position and in which said one portion of said actuator is proximate but spaced from said first limit position, and for stopping rotational motion of said first means at another position in which said valve plate is essentially at said second position and in which said one portion of said actuator is proximate but spaced from said second limit position.

4. The combination of claim 3 in which said actuator portion moves essentially in translation, in which said link means is connected to said crank means with a pivot connection, and in which the plane in which forces are applied by said link means to said pivot connection is spaced from the plane of said bearing means for creating a force tending to cock said crank means relative to said bearing means during continuing application of force by said actuator portion while rotational motion of said shaft means is stopped by said stop means.

5. The combination of claim 3 in which said limited-force actuator is a pneumatic servo including a spring and in which a force is exerted in one direction on said one portion thereof in response to a pneumatic pressure differential and a force is exerted in the opposite direction on said one portion by said spring.

6. The combination of claim 1 in which said bearing means includes a low-friction bearing material which is adversely affected by excessive temperatures, and further including heat-transfer reducing means for reducing the transfer of heat from said valve plate to said bearing means.

7. The combination of claim 6 in which said heat transfer reducing means comprises a loose connection between said shaft means and said crank means.

8. The combination of claim 7 in which said loose connection comprises a non-circular end portion on said shaft means and a correspondingly shaped aperture in said crank means larger in size than said end portion.

9. The combination of claim 6 in which said heat transfer reducing means comprises an elongated and thin portion of said crank means.

10. The combination of claim 1 in which said actuator portion moves essentially in translation, in which said link means is connected to said crank means with a pivot connection, and in which the plane in which forces are applied by said link means to said pivot connection is substantially the same as the plane of said bearing means.

11. The combination of claim 1 in which said actuator portion moves essentially in translation, in which said link means is connected to said crank means with a pivot connection, and in which the plane in which forces are applied by said link means to said pivot connection is spaced from the plane of said bearing means by a distance which is small relative to the distance between the plane of said bearing means and said one portion of said crank means.

* * * * *